United States Patent
Langenberg et al.

(10) Patent No.: US 8,867,630 B2
(45) Date of Patent: Oct. 21, 2014

(54) AGILE SWITCHED-LOAD RESONATING TRANSMITTER FOR PASSBAND POWER LINE COMMUNICATION

(75) Inventors: Daniel Langenberg, Maryland Heights, MO (US); David W. Rieken, St. Peters, MO (US)

(73) Assignee: Aclara Technologies LLC, St. Louis, MO (US)

( * ) Notice: Subject to any disclaimer, the term of this patent is extended or adjusted under 35 U.S.C. 154(b) by 68 days.

(21) Appl. No.: 13/816,386

(22) PCT Filed: Aug. 12, 2011

(86) PCT No.: PCT/US2011/047525
§ 371 (c)(1),
(2), (4) Date: Feb. 11, 2013

(87) PCT Pub. No.: WO2012/021770
PCT Pub. Date: Feb. 16, 2012

(65) Prior Publication Data
US 2013/0177087 A1    Jul. 11, 2013

Related U.S. Application Data

(60) Provisional application No. 61/373,586, filed on Aug. 13, 2010.

(51) Int. Cl.
*H04B 3/00* (2006.01)
*H04B 3/56* (2006.01)
*H04B 3/54* (2006.01)

(52) U.S. Cl.
CPC ......... *H04B 3/56* (2013.01); *H04B 2203/5458* (2013.01); *H04B 3/54* (2013.01)
USPC ......................................... 375/257; 375/220

(58) Field of Classification Search
USPC .................................................. 375/257, 220
See application file for complete search history.

(56) References Cited

U.S. PATENT DOCUMENTS 4,371,867 A    2/1983  Gander
5,691,691 A *  11/1997  Merwin et al. ................ 375/259
(Continued)

FOREIGN PATENT DOCUMENTS

JP           2000349508 A     12/2000

OTHER PUBLICATIONS

International Search Report for PCT application PCT/US2011/047525 mailed Jan. 5, 2012.
(Continued)

*Primary Examiner* — Kabir A Timory
(74) *Attorney, Agent, or Firm* — Polster, Lieder, Woodruff & Lucchesi, L.C.

(57) ABSTRACT

An agile switched-load transmitter for a communications system for a power distribution network comprises a resonant transponder (T1) with a variable primary frequency. The transmitter significantly increases the bandwidth for communications, significantly lessens the effect of bandwidth noise, and greatly improves both the quality of communications and data throughput. Switches (S1, S2) selectively connect the transponder to the communications systems and control current flow through a resonant circuit of the unit, particularly the timing between charging and discharging of a capacitive component thereof. This allows the frequency of operation of the transmitter to be controlled so an inbound signal has a frequency within a range of selected frequencies, rather than a fixed frequency, and enables the transponder to deliver an output signal of relatively high power that propagates through the power distribution network with relatively little loss in signal strength.

20 Claims, 3 Drawing Sheets

(56) References Cited

U.S. PATENT DOCUMENTS

2006/0097572 A1* 5/2006 Drouin et al. .................. 307/1
2009/0236907 A1   9/2009 Bertrand et al.
2012/0306406 A1* 12/2012 Grisamore et al. .......... 315/294

OTHER PUBLICATIONS

Written Opinion of the International Search Authority for PCT application PCT/US2011/047525 mailed Jan. 5, 2012.

* cited by examiner

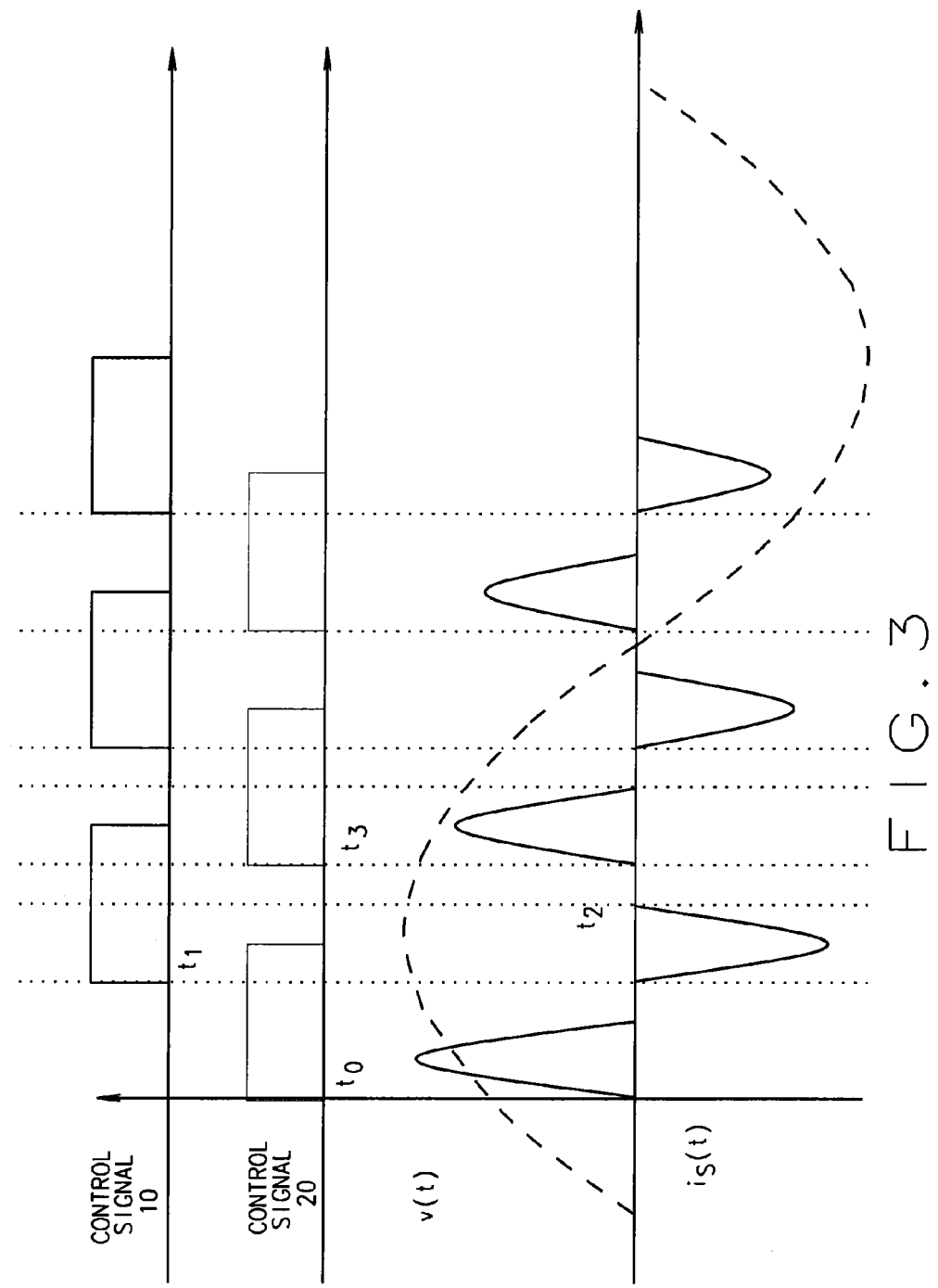

AGILE SWITCHED-LOAD RESONATING TRANSMITTER FOR PASSBAND POWER LINE COMMUNICATION

CROSS-REFERENCE TO RELATED APPLICATIONS

This application claims the benefit of provisional application, 61/373,586 filed Aug. 13, 2010, and International Application PCT/US2011/047525 filed Aug. 12, 2011 and published under International Publication No. WO 2012/021770, by Daniel Langenberg and David W. Rieken for "Agile Switched-Load Resonating Transmitter For Passband Lower Line Communication", both of which are incorporated herein by reference.

STATEMENT REGARDING FEDERALLY SPONSORED RESEARCH

Not Applicable.

BACKGROUND OF THE INVENTION

This invention relates to a communications system employed in electrical distribution systems and the like; and, more particularly to an improvement in a switched-load transmitter used in such communications systems.

As discussed in provisional patent application 61/332,406, conventional transmitters installed in some electric meters are resistive load transponders. These transmitters have certain disadvantages including, for example, heat dissipation, frequency response, line interferences, and problems with the local voltage supply, as well as requiring a great deal of power in order to achieve the signal strengths needed for a communication's link.

A proposed solution to these problems, as set forth in provisional patent application 61/332,406, is to replace these transmitters with a resonating transmitter in which the resistive load is replaced with a purely reactive load having both capacitive and inductive elements. Such a transmitter, with appropriate modulation, consumes substantially less power while producing inbound signals of sufficient spectral signal strength. That is, the resonating transmitter generates pulses useful for passband communications while consuming, on average, 100 times less power than the resistive switched-load transmitters currently in use in communications networks. The signal strength produced by the resonating transmitter has been found to be comparable to that produced by conventional resistive load transmitters at the necessary frequencies. However, certain problems still remain. One of these is that the transmitter transmits only a dampened sinusoidal signal which limits the rate at which data can be transmitted over the utility's power distribution network. A second problem has to do with the relatively narrow bandwidth in which the resonant transmitter operates. It has been found that the resonant transmitter is subject to signal-to-noise (SNR) degradations due to powerful narrowband noise, this being because the transmitter is a narrowband transmitter. This degradation impacts the quality of transmissions from the transmitter and requires improvement.

BRIEF SUMMARY OF THE INVENTION

The present invention describes a significant improvement over the resonating transmitter described in the co-pending provisional application. The present invention incorporates a switching circuit that provides a controllable switch-on, switch-off capability for a resonant transmitter making the transmitter an "agile" transmitter or transponder. The transmitter is used to generate "inbound" signals within a utility's communications system. The transmitter now has a variable carrier frequency which is accomplished by controlling individual half cycles of the signal pulse produced by transmitter's resonating circuit so to shift them in time to approximate a signal with a lower resonant frequency but with comparable signal energy. Importantly, this is achieved using relatively simple logic and timing to control the switching. Employing a resonant frequency transmitter with a variable carrier frequency significantly increases the bandwidth for communications, significantly lessens the effect of colored noise, and greatly improves the quality of communications which can be point-to-point or point-to-multipoint.

The result is a communications system having greater bandwidth than is currently attainable with a resonant transmitter. By increasing available bandwidth, the interference which is common in the utility's power distribution system is now greatly mitigated.

Second, and also importantly, the present invention has the advantage of now providing a utility communications system capable of operating at multiple frequencies over the same communications channel. This then allows for parallelism using a feature similar to frequency division multiplexing. That is, multiple transmitters can be used to transmit over the same channel because each transmitter operates at a different frequency within the expanded bandwidth. The result is an increase in data throughput through the power distribution system using the communications system. For example, up to eight, or more, different frequency channels can now be made available thereby increasing throughput by a factor of eight.

The resonating transmitter of the present invention also has high output power which is generated relatively cheaply. The result is a transmitter which is superior to active mode transmitters and provides low or very low frequency signals that propagate long distances on low and medium voltage power lines and penetrate transformers and other network components interposed in such lines.

Another advantage is that the size requirements for components used in the agile transmitter are reduced, thereby lowering the transmitter's cost.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

FIG. 3 is time line illustrating operation of the agile transmitter;

Corresponding reference characters indicate corresponding parts throughout the several views of the drawings.

DESCRIPTION OF THE PREFERRED EMBODIMENT

Figure 1:
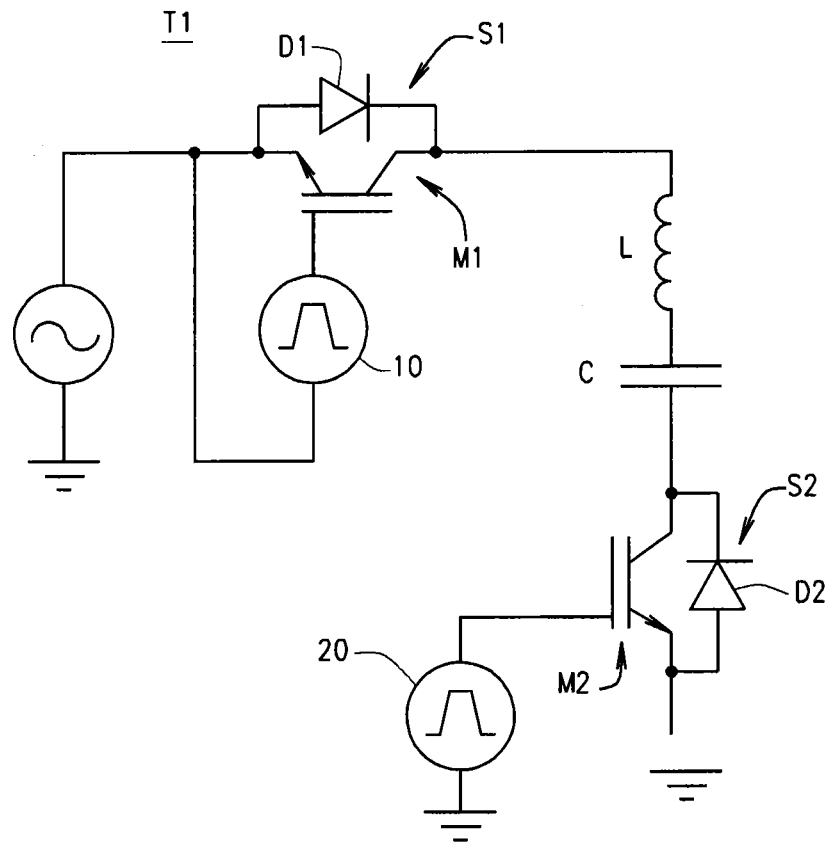
FIG. 1 is a simplified schematic of a resonant frequency transmitter of the present invention with frequency shifting capability and FIG. 2 represents an output waveform of the transmitter.

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Referring to FIG. 1, an agile transmitter or transponder T1 of the present invention is shown which is capable of point-to-point or point-to-multipoint communications within the network. Transmitter T1 includes a reactive load comprised of an inductor L and a capacitor C connected in series. These components are connected in series with the utility's power distribution network. The transponder further includes two switches S1 and S2 both of which are implemented using a MOSFET, M1 and M2 respectively. As known to those skilled in the art, MOSFETs M1 and M2 control current flow only in one direction. Diodes D1, D2 are respectively connected across the MOSFETs M1, M2 to compensate for the one way current flow provided by these devices.

Switch S1 is switched "on" and "off" by a control circuit 10 and switch S2 by a control circuit 20. These control circuits are implemented using hardware, software, or firmware without departing from the scope of the invention. However the switching is implemented, the result is the ability to control individual half-cycles of the signal produced by transmitter T1's resonating circuit. Further, those skilled in the art will understand that each control circuit is separately programmable to control the respective circuits operation to turn its associated switch "on" and "off".

Referring to FIG. 3, when transmitter T1 is initially connected to the AC power line, the transponder circuit has zero energy in it. Current then begins to flow through the circuit when one of the switches M1, M2 is activated by a control signal from circuit 10 or 20, this occurring when the AC line is at a non-zero voltage level. For example, and as shown in FIG. 3, activating MOSFET M2 with a signal from control circuit 20 at time t0, while MOSFET M1 remains "off", allows a positive current to flow through the load of transmitter T1, provided the voltage across the load is positive at the time of switching. The control signal from circuit 20 must remain "high" so long as the current flow is positive, or else the current flow will stop.

In order for a negative current to flow through the circuit, a control signal from circuit 10 to MOSFET M1 goes "high" at time t1. A control signal from circuit 20 to MOSFET M2 now switches this switch from "high" to "low", deactivating the switch. This occurs before time t2 so positive current does not flow through the circuit. As shown in FIG. 3, this switching sequence is repeated. The period of the signal produced using this method is t3-t0.

As power line potential increases, potential energy between the power line and the transponder's resonant circuit formed by inductor L and capacitor C also increases. When the amount of potential energy reaches a desired level, control circuit 10 switches switch S1 "on" enabling current flow from the power line into the resonator circuit. Inductor L initially impedes current flow into capacitor C; but, gradually current begins to flow into the capacitor. Current flow into the capacitor continues until the voltage across the capacitor equals the AC line voltage. At this time, inductor L has a maximum amount of energy stored in its associated magnetic field and starts to discharge this stored energy into the capacitor. This increases the voltage across capacitor C. When inductor L has substantially discharged all of its stored energy into capacitor C, there is now a large voltage across the capacitor that can be discharged back onto the AC power line. However, at this time, control circuit 20 has switch S2 switched "off", so capacitor C cannot discharge the voltage.

Figure 2:
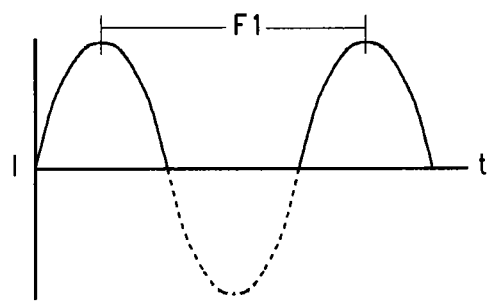
Figure 4A:
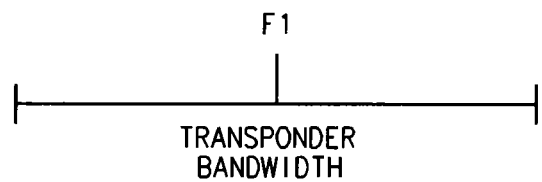
FIGS. 4A and 4B illustrate the range of frequencies available over a communications channel between a resonant transmitter of the present invention (FIG. 4B) and a previously developed resonant transmitter (FIG. 4A); and, FIG. 5 is a simplified representation of a communications system employing multiple resonant transmitters simultaneously operating over the same communications channel.

It will be understood by those skilled in the art that if control circuit 20 were immediately to turn switch S2 "on", the LC circuit would naturally resonate at a frequency determined by the values of the inductor and capacitor. In FIGS. 2 and 4A, this would be the frequency F1. But, so long as control circuit 20 does not turn switch S2 "on", the next resonant half-cycle pulse can be arbitrarily delayed. Tests have indicated that this delay can be up to 0.4 msec, for example. It will be appreciated by those skilled in the art that longer periods of time, up to several seconds, may be possible, depending upon the final design of the transponder.

When control circuit 20 does turn switch S2 "on", current now flows from capacitor C, back through inductor L, to the power line. When the voltage across capacitor C again equals the power line voltage, the amount of energy stored in inductor L is at a maximum, and current flow onto the power line is also at a maximum.

Ideally, energy is transferred back onto the power line until both capacitor C and inductor L are completely drained of energy. It has been shown, however, that because the system is an AC system, that while the initial signal pulse stops at approximately 0 volts, subsequent signal pulses stop at a level below 0 volts. This is because of the energy stored in inductor L. That is, due to the energy retained by inductor L, capacitor C experiences an increase in the negative voltage across it. The result is that even if switch S2 is turned "off" by control circuit 20 during the last resonance cycle, there is potential energy remaining between capacitor C and the power line. A result of this remaining potential energy is that a "window" is created as to when the next resonance cycle is started. Those skilled in the art will understand that this "window" is not a required signal time, but an indicator of an optimal switching time.

Figure 4B:
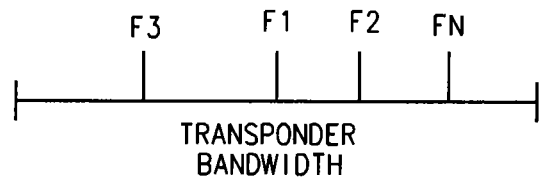

In accordance with the forgoing, transponder T1 is capable of providing an output signal of a frequency which is adjustable by controlling the charging and discharging of capacitor C through the controlled switching of switches S1 and S2 by respective control circuits 10 and 20. Referring to FIG. 4A, the signals produced by transponder T1, and which are superimposed on a waveform propagated over the power distribution system, are not fixed at the operating frequency F1 of the transponder; for example, 1 KHz. Rather, as shown in FIG. 4B, the signals produced by the transponder are one of a range of frequencies F1, F2, F3 . . . Fn which frequencies are within the transponder's bandwidth and fall within the "window" provided by the controlled switching of switch S2 as noted above. The frequency F2 generated by transmitter T1 can, for example, be on the order of 550 Hz. Importantly, control of the switching is dynamic; meaning that transmitter T1 is an agile transmitter whose output signal pulse frequency is variable for each half-cycle of the pulse signals generated by the transmitter. Further, properly controlling operation of the switches enables transponder T1 to deliver an output signal of relatively high power that can travel through low-voltage and medium-voltage power lines of the utility's power distribution network with relatively little loss in signal strength; regardless of line length from the signal's point of origin to its destination, and regardless of the various network components (switches, transformers, etc.) through which the signal passes as it propagates through the network.

Figure 5:
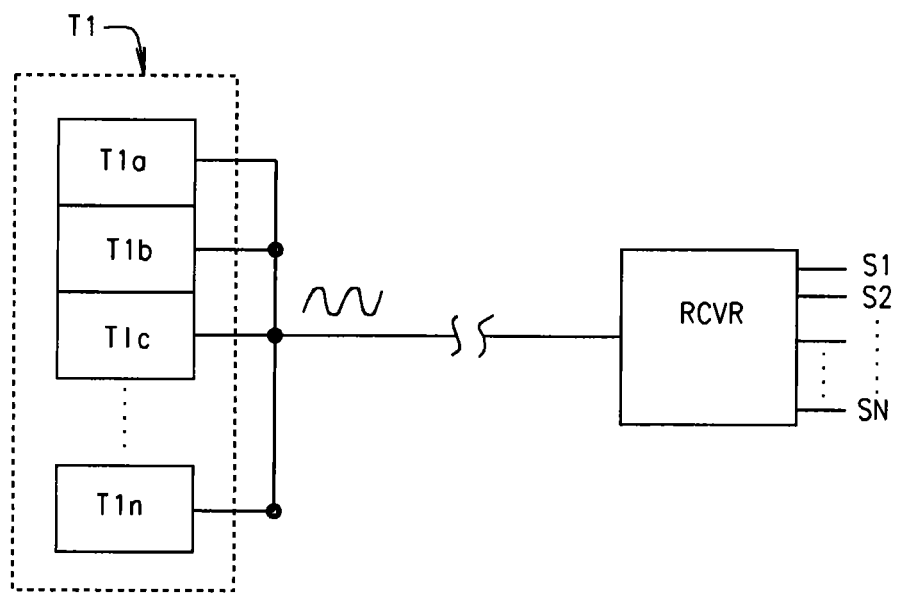

A first advantage of using an agile transponder T1 is the wider bandwidth now provided. The significance of this is that the narrowband noise which affects the signal-to-noise ratio (SNR) of transmitted pulses is now substantially overcome. In addition, use of agile transmitters or transponder's allows for multiple frequency channels. This is analogous to the network shown in FIG. 5. In FIG. 5, transponder T1 can, in effect, represent a plurality of transmitters T1a, T1b, T1c...T1n, each operating at a different frequency within the transponders bandwidth. Parallel operation of these transmitters results in a parallelism similar to that achieved through frequency division multiplexing (FDM). The overall result from use of a transmitter T1 is a higher data throughput by the network's communications system. Initial indications are that up to, at least, eight frequency channels can be made available increasing the data throughput of the communications system accordingly.

Overall, the agile transmitter of the present invention provides greater flexibility in the operation of a utility's communications system than has heretofore been achievable. Further, this flexibility is achieved without incurring significant cost penalties in either hardware or software. With regard to overall operation of the communications system, use of a resonating circuit directly from an AC power line allows for the creation of large current signals without the need for a large power supply. This both reduces overall power consumption and allows the transmitter to fit directly inside an electrical meter.

In view of the above, it will be seen that the several objects and advantages of the present disclosure have been achieved and other advantageous results have been obtained.

The invention claimed is:

1. In a communications system used to transmit signals over a power distribution network, an agile, switched-load transmitter for use in signaling, the agile, switch-loaded transmitter comprising:
   a transponder having a resonating circuit with a reactive load including an inductive component and a capacitive component; and,
   switch means for selectively connecting the transponder to the communications system, the switch means controlling the timing as to when the resonating circuit is connected to the communications system so to maximize a storage and usage of potential energy in the resonating circuit and thereby a frequency of operation of the transponder so that an inbound signal has a frequency which is within a range of selected frequencies producible by the transmitter, rather than a fixed frequency.

2. The system of claim 1 in which the switch means controls individual half cycles of the signal produced by the resonating circuit by shifting the half cycles in time, whereby the transmitter has a variable carrier frequency.

3. The transmitter of claim 2 whose output signal frequency is at, or below, a resonant frequency of the transmitter, but which output signal has comparable signal amplitude to an output signal transmitted at the resonant frequency.

4. The transmitter of claim 2 affecting parallel communications over the power distribution network and thereby increasing the data throughput of the system.

5. The transmitter of claim 1 further including control means controlling switching of the switch means.

6. The transmitter of claim 5 in which the switch means comprises a pair of switches for connecting the resonant circuit to an AC power line of the power distribution network.

7. The transmitter of claim 6 in which each switch is a MOSFET.

8. The transmitter of claim 6 in which the control means includes a control circuit for each switch.

9. The transmitter of claim 7 in which each control circuit is programmable to control switching of its associated switch.

10. In a communications system used to transmit signals over a power distribution network, a method for inbound signaling comprising:
    providing an agile transmitter having a resonating circuit with a reactive load including an inductive component and a capacitive component; and,
    selectively connecting the transmitter to the communications system using a switch means, the switch means controlling a timing as to when the resonating circuit is connected to the communications system so to maximize a storage and usage of potential energy in the resonating circuit and thereby a frequency of operation of the transponder whereby a frequency of a signal produced by the transmitter as part of the inbound signal is a frequency which is within a range of selected frequencies rather than a fixed frequency.

11. The method of claim 10 further including controlling individual half cycles of the signal produced by the resonating circuit by shifting the half cycles in time using the switch means so for the agile transmitter to have a variable carrier frequency.

12. The method of claim 11 in which the output signal frequency is at, or below, a resonant frequency of the agile transmitter, but which output signal has a comparable signal amplitude to an output signal transmitted at the resonant frequency.

13. The method of claim 11 for affecting parallel communications over the power distribution network hereby increasing the data throughput of the system.

14. The method of claim 10 in which the switch means comprises a pair of switches for connecting the resonant circuit to an AC power line of the power distribution network, and control means including a control circuit for each switch.

15. The method of claim 14 in which each control circuit is programmable to control switching of its associated switch.

16. In a communications system used to transmit signals over a power distribution network, a method for inbound signaling comprising:
    providing an agile transmitter having a resonating circuit with a reactive load including an inductive component and a capacitive component;
    selectively connecting the transmitter to the communications system using a switch means which selectively controls a timing as to when the resonating circuit is connected to the communications system so to maximize a storage and usage of potential energy in the circuit and thereby a frequency of operation of the transponder whereby a frequency of the signal is variable between a plurality of frequencies within the agile transmitter's bandwidth; and,
    varying a signal's frequency from one half-cycle of the signal's waveform to a next half-cycle thereof whereby the transmitter's output is multiplexed to produce a plurality of frequency channels by which information is transmitted through a network thereby increasing a throughput of the communications system.

17. The method of claim 16 in which the output signal frequency of a signal produced by the transmitter is at, or below, a resonant frequency of the agile transmitter, but which output signal has comparable signal amplitude to an output signal transmitted at the resonant frequency.

18. The method of claim 17 in which the switch means comprises a pair of switches for connecting the resonant circuit to an AC power line of the power distribution network, and control means including a control circuit for each switch.

19. The method of claim 18 in which each control circuit is programmable to control switching of its associated switch.

20. The method of claim 16 in which the throughput of the communication's system is increased by a factor corresponding to the number of frequency channels produced.

* * * * *